United States Patent
DiLullo Arias et al.

(10) Patent No.: US 6,235,809 B1
(45) Date of Patent: *May 22, 2001

(54) MULTI-FUNCTIONAL ADDITIVE FOR USE IN WELL CEMENTING

(75) Inventors: Gino F. DiLullo Arias, Caracas (VE); Phillip J. Rae, Landridge Condo (SG); Dan T. Mueller, Cypress, TX (US)

(73) Assignee: BJ Services Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,492

(22) Filed: Sep. 29, 1998

Related U.S. Application Data

(60) Provisional application No. 60/060,587, filed on Sep. 30, 1997.

(51) Int. Cl.[7] .............................. C09K 7/02; C09K 7/00; C08K 3/00; E21B 33/13
(52) U.S. Cl. ..................... 523/130; 523/131; 523/132; 524/4; 524/5; 524/6; 166/293; 166/295
(58) Field of Search ................. 524/4, 5, 6; 523/130, 523/131, 132; 166/293, 295

(56) References Cited

U.S. PATENT DOCUMENTS

| | | | |
|---|---|---|---|
| 4,048,077 | 9/1977 | Engelhardt et al. | 252/8.5 C |
| 4,083,407 | 4/1978 | Griffin, Jr. et al. | 166/291 |
| 4,309,523 | 1/1982 | Engelhardt et al. | 526/240 |
| 4,568,471 | 2/1986 | Defosse | 252/8.55 R |
| 4,587,283 | 5/1986 | Hille et al. | 524/3 |
| 5,020,598 | 6/1991 | Cowan et al. | 166/293 |
| 5,116,421 | 5/1992 | Ganguli | 106/823 |
| 5,447,197 | 9/1995 | Rae et al. | 166/293 |
| 5,464,060 | 11/1995 | Hale et al. | 166/293 |
| 5,488,991 | 2/1996 | Cowan et al. | 166/293 |
| 5,547,506 | 8/1996 | Rae et al. | 106/730 |
| 5,795,924 * | 8/1998 | Chatterji et al. | 523/130 |

OTHER PUBLICATIONS

Facts and News: Chemicals for Water–Based Drilling Fluids and Their Temperature Limitations by Dr. Hille, Hoechst Aktiengesellschaft, Sep. 1983.

* cited by examiner

*Primary Examiner*—Tae H. Yoon
(74) *Attorney, Agent, or Firm*—Howrey Simon Arnold & White, LLP

(57) ABSTRACT

This invention relates to a cement composition for cementing oil, gas and geothermal wells comprising: a cement; and an additive comprising a blend of a sodium silicate; water; a carrageenan suspending agent; a sodium polyacrylate; an AMPS terpolymer; a dispersant; and a cellulosic water soluble polymer. The dispersant may comprise a sulfonated naphthalene formaldehyde condensate or a sulfonated ketone acetone formaldehyde condensate. The cellulosic water soluble polymer may comprise HEC or CMHEC. The invention can also function to reduce the occurrence of gas channelling and stabilize foam created by adding nitrogen gas to cement.

30 Claims, 1 Drawing Sheet

MULTI-FUNCTIONAL ADDITIVE FOR USE IN WELL CEMENTING

This application claims priority of provisional application 60/060,587 filed on Sep. 30, 1997.

FIELD OF THE INVENTION

This invention relates to an additive for cement compositions that: (1) prevents the occurrence of gas channeling; (2) functions as a density-reducing extender; (3) controls fluid loss; (4) minimizes free water; (5) improves slurry stability; and (6) stabilizes nitrogen foam.

BACKGROUND OF THE INVENTION

It is commonly known in the oil and gas industry to use cement compositions to form a sheath in the annulus of an oil or gas well. Cement compositions used in this manner may include cement and any number of additives known in the art. It is also known in the industry that lower density cement compositions (less than about 14 pounds/gallon) are preferable because a higher density cement composition (greater than about 14 pounds/gallon) may fracture the formation.

Gas channeling in a cement composition is a common problem in the oil and gas industry. When a cement composition slurry is first placed in the annulus of an oil or gas well, it is a hydraulic fluid that exerts hydrostatic pressure on the sides of the well. Initially the hydrostatic pressure of the cement composition is great enough to keep gases that are naturally occurring within the reservoir in situ. But as the slurry of cement composition sets, it goes through a transition stage changing from liquid to solid. During this transition stage, the cement composition exerts less and less hydrostatic pressure on the well. It is in this transition stage that the cement composition is susceptible to formation gas entering into the cement sheath. The gas entering into the cement sheath produces pathways filled with gas. As the cement hardens, the pathways become channels in the hardened cement composition, thus the term channeling. Channels in a cement composition weaken the structure of the cement and may compromise the formation of a competent seal within a well.

The advantage of using light weight or lower density cement compositions is that the formation is less likely to fracture than with higher density additives. Light weight or lower density cement is a cement that has a density of less than about 14 pounds per gallon. With lower density cement compositions, it is more difficult to control interstitial water, which is the water between the cement particles. Controlling gas migration to reduce channeling in light weight cement compositions, especially at low temperatures, has been an industry problem for a number of years because the typical additive systems are better suited for heavier or higher density cement compositions.

Presently, the industry typically reduces gas migration using film-forming materials such as SBR latex or polyvinyl alcohol or microparticulate additives such as silica fume in combination with fluid-loss additives to make a cement composition less permeable. These materials work best, however, in cement compositions that have a high cement density and a low water to cement ratio. The lower the cement density and the higher water to cement ratio, the greater the quantity of water soluble or film-forming additives that are required to reduce gas migration to an acceptable level and keep channeling to a minimum. The lower the cement density, therefore, the greater the quantity of traditional additives that are required. This quantity increases to a point that is cost prohibitive for lower density cement compositions.

Controlling gas in light weight cements, especially at low temperatures, has been an industry problem for a number of years because the additive systems that are generally used or employed are better suited for heavier or higher density cements. The additive of this invention presents an alternative that works well with light-weight-low-density cement compositions.

SUMMARY OF THE INVENTION

This invention relates to a cement composition for cementing oil, gas and geothermal wells comprising: a cement; and an additive comprising a blend of a sodium silicate; water; a carrageenan suspending agent; a sodium polyacrylate; an AMPS terpolymer; a dispersant; and a cellulosic water soluble polymer. The dispersant may comprise a sulfonated naphthalene formaldehyde condensate or a sulfonated ketone acetone formaldehyde condensate. The cellulosic water soluble polymer may comprise HEC or CMHEC.

Further, this invention relates to a dry cement additive, comprising: a suspending agent; a water absorbent material; a dispersant; a sulfonated ketone-acetone formaldehyde condensate; a sodium polyacrylate; an AMPS terpolymer; and a cellulosic water soluble polymer. The dry cement additive may be suspended in synthetic oil, mineral oil, processed oil, hydrocarbon oil, or vegetable oil.

This invention also relates to a method for reducing the occurrence of gas channeling in cement or stabilizing foam created by adding nitrogen gas to a cement composition, comprising: adding a multifunctional additive to cement, wherein said additive comprises: water about 30.00% to 50.00% by weight; sodium silicate at about 40.00 to 60.00% by weight; a cellulosic water soluble polymer at about 1.0 to 8.0% by weight; a sulfonated naphthalene formaldehyde condensate at about 0.5 to 3.0% by weight; sodium polyacrylate at about 0.1% to 1.0% by weight; an AMPS terpolymer dispersant at about 0.1% to 1.0% by weight; a carrageenan suspending agent at about 0.1% to 1.0% by weight; KCL at about 0.05% to 1.0% by weight; and biocide at about 0.01% to 0.05% by weight.

DETAILED DESCRIPTION OF THE INVENTION

Figure 1:
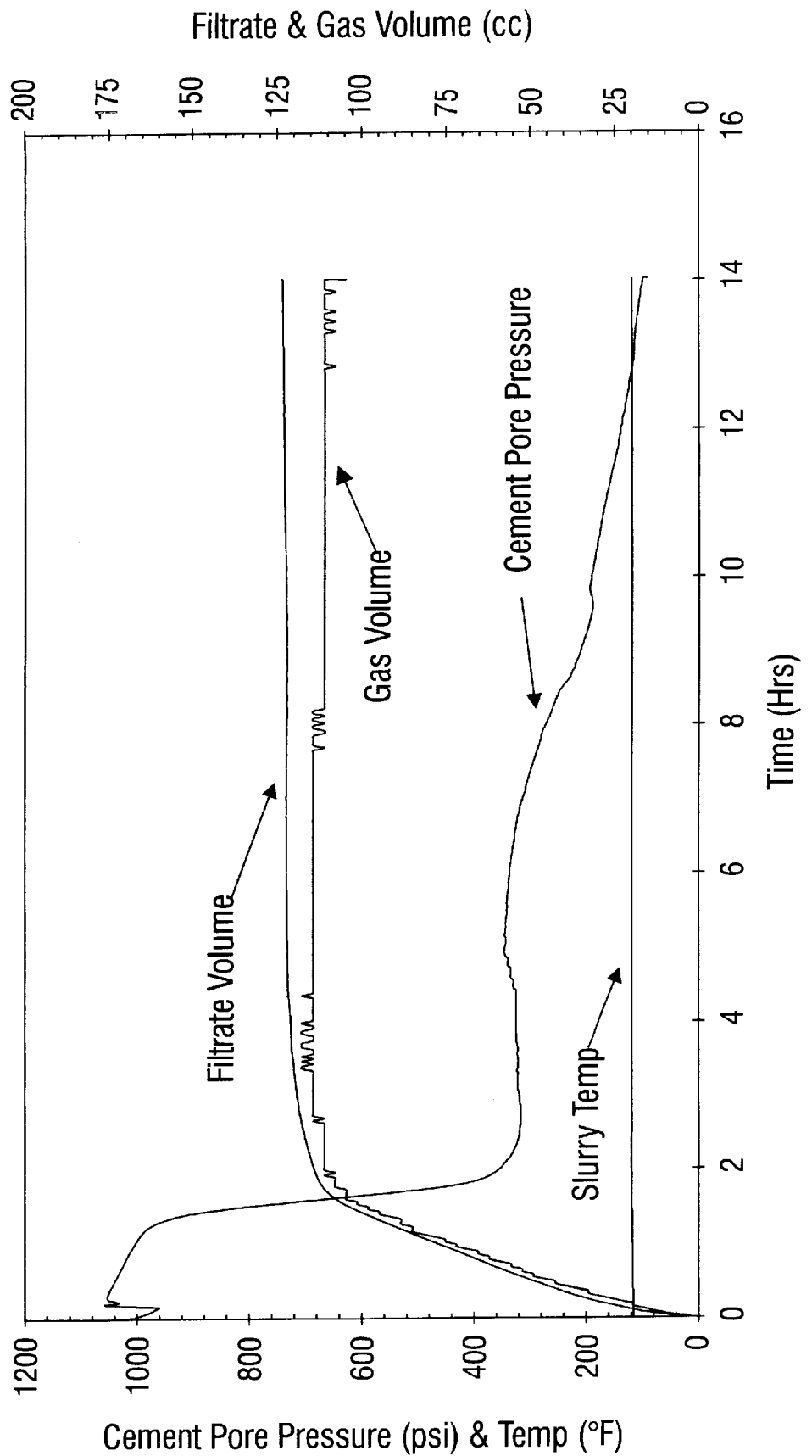
FIG. 1 is a graph showing the results of Gas Model testing described in Examples 2 and 3. The graph shows: a slurry temperature curve that displays the temperature of the slurry on the interior of a test cell; a filtrate volume curve which shows the amount of filtrate that penetrates through the 325-mesh screen at the base of a test cell; a gas volume curve that shows the amount of gas that enters a cell displacing the filtrate; and a cement pore pressure curve which shows the pressure recorded by a transducer located on the side of a test cell. The cement pore pressure (psi) and slurry temperature (° F.) may be found on the right side of the graph, the time in hours may be found across the bottom of the graph, and the filtrate and gas volume (cc) may be found on the right side of the graph.

The disclosed composition includes the use of a gel-structure building material to limit free water, minimize slurry settling, control fluid loss and stabilize nitrogen foam within the cement slurry. Other components within the disclosed system allow for: (1) the addition of water to lower density; (2) the reduction of the system viscosity; (3) the acceleration of the thickening time and compressive strength development and (4) further control of fluid loss. In addition, the high pH of the base additive fluid allows for the sequestration of the hydration of the cellulosic component, allowing for a high concentration of polymer to be contained in the additive. A preferred base fluid that has a pH of greater than about 11 is comprised of sodium silicate and water. In combination, the effects of the additives of this invention provide gas control of the slurry allowing for a gas-tight design. The disclosed composition may be in dry form, in dry form suspended in oil-based carrier fluids, or in dry form mixed in a water based medium.

Any cement known to one of ordinary skill in the art may be used for this invention. However, preferred cements for use with this invention include Portland cement, pozzolan, Blast furnace slag, or blends of any of these three. One embodiment of the present invention is an aqueous cement slurry composition for cementing oil, gas and geothermal wells comprising cement slurry and about 5 to 150 gallons of an aqueous based additive per 100 sacks of cement or cement blend. The aqueous based additive comprises a blend of 40–51° baume sodium silicate and water containing a carrageenan suspending agent, a sulfonated naphthalene formaldehyde condensate, and/or a sulfonated ketone-acetone formaldehyde condensate, and/or sodium polyacrylate and/or an AMPS terpolymer dispersant, and a cellulosic water soluble polymer including HEC and/or CMHEC (carboxy methyl hydroxy ethyl cellulose). This combination produces a slurry exhibiting low fluid loss, minimal free water, excellent solids support, and unexpected gas migration control. Low fluid loss is accomplished by establishing a low permeability filter cake in the presence of differential pressure against a permeable medium. Low fluid loss for a light weight cement is less than 100 cc per 30 minutes using the API fluid loss test. Low fluid loss for a cement having greater than about 14 pounds per gallon density is less than about 50 cc per 30 minutes using the API fluid loss test .

One preferred embodiment of this invention comprises about 30% to about 50% by weight of water, about 40.00 to about 60.00% by weight 40–51° baume sodium silicate, about 1.0 to about 8.0% by weight CMHEC, about 0.5 to about 3.0% by weight sulfonated naphthalene formaldehyde condensate, about 0.1% to about 1.0% by weight sodium polyacrylate, about 0.1% to about 1.0% by weight AMPS terpolymer dispersant, about 0.1% to about 1.0% by weight carrgeenan suspending agent, about 0.05 to about 1.0% by weight KCl, about 0.01% to about 0.05% by weight biocide and optionally about 0.01% to about 0.05% by weight blue dye.

For example, an embodiment of this invention comprises about 38.93% by weight water, about 51.72% by weight of a 40–51° Baume sodium silicate, about 6.6% by weight of CMHEC, about 1.4% by weight sulfonated naphthalene formaldehyde condensate, about, 0.46% by weight sodium polyacrylate, about 0.37% by weight AMPS terpolymer dispersant, about 0.35% by weight carrageenan suspending agent, about 0.12% by weight KCL, 0.02% by weight biocide and optionally 0.03% by weight blue dye.

Another preferred embodiment of this invention is a dry version based on the above disclosed composition. The dry additive comprises the following: sodium metasilicate, a carrgeenan suspending agent, a sulfonated naphthalene formaldehyde condensate, and/or a sulfonated ketone-acetone formaldehyde condensate, and/or sodium polyacrylate, and/or an AMPS terpolymer dispersant, and a cellulosic water soluble polymer including HEC or CMHEC. A multi-functional suspension may be prepared by suspending the dry additive of this invention into an oil such as a synthetic, mineral, processed hydrocarbon, vegetable or similar oil. This suspension is multi-functional and exhibits low fluid loss, minimal free water, excellent solids support and, unexpected gas migration control.

A preferred sodium metasilicate for use in this invention is commercially available from BJ Services as A-2. A preferred carrageenan suspending agent for use in this invention is commercially available from BJ Services as LSS-1. A preferred sulfonated naphthalene formaldehyde condensate for use in this invention is commercially available from BJ Services as CD-31. A preferred sodium polyacrylate for use in this invention is commercially available from BJ Services as LSP-1. A preferred sulfonated ketone-acetone formaldehyde condensate for use in this invention is commercially available from BJ Services as CD-33. A preferred AMPS terpolymer dispersant for use in this invention is HOSTAMER V2825™ commercially available from Clariant Corporation in Charlottesville, N.C. A preferred HEC for use in this invention is commercially available from BJ Services as FL-52. A preferred CMHEC for use in this invention is commercially available from BJ Services as GW-28.

The determination of the amount of additive to add to a cement slurry to create the gas-tight design described as a byproduct of this invention can be based on the parameters of a particular well such as temperature and pressure. A preferred amount of additive may be determined for the particular temperature and pressure parameters of a particular well by running a series of tests described and incorporated by refererence herein. First, to produce gas-tight designs using the multi-functional additive of this invention, it is necessary to add sufficient additive to lower the API Fluid Loss to level below approximately 100 cc/30 min rate for a low density cement composition or approximately 50 cc/30 min rate for a high density cement composition. A test for determining the API Fluid Loss may be found in *API Recommended Practice 10B, Twenty-Second Edition*, December 1997, and is incorporated herein by reference. Sufficient additive must also be added to minimize the free fluid content of the gas-tight design to below approximately 0.2 mL. A test for determining the free fluid content of a cement may be found in *API Recommended Practice 10B, Twenty second Edition*, December 1997 and is incorporated herein by reference. It is necessary to add a sufficient amount of additive such that the gas-tight design exhibits minimal sedimentation. A test for determining sedimentation may be found in *API Recommended Practice 10B, Twenty-Second Edition*, December 1997, and is incorporated herein by reference. For gas control designs, the maximum desirable density differential between the top sample and bottom sample, as described in *API Recommended Practice 10B, Twenty-Second Edition*, December 1997, should be no greater than 0.2 Lb/gal. Once it is determined that a particular amount of additive will result in: an API Fluid Loss level below approximately 100 cc/30 min rate; free fluid content of the gas-tight design to below approximately 0.2 mL, and a minimal sedimentation, GasFlow Model Testing as described in Examples 2 and 3 may be performed to determine the fluid loss, transition time, and permeability to resist gas instrusions.

The additives of this invention may be added to cement compositions by any methods know to one of ordinary skill in the art. One preferred method to add the additive of this invention to cement is through liquid additive systems. Water based and oil based additives can be added to cement compositions by injecting or placing the additive into displacement tanks on a cementing unit. The additive may be allowed to fall into the mix water, disperse, and then be used to mix with cement. Another preferred method is to add dry form additives of this invention by dry blending them with the cement at a cement bulk facility. The blend of dry cement and additive can then used to form a slurry.

The additive of this invention differs primarily from other commonly used additives because it controls annular gas, but may be used strictly as a fluid loss additive or as an extender. The additive of this invention is a material that acts both as a density reducing extender which allows use of a large amount of water thereby lowering the density of the cement composition and to control fluid loss of the cement composition which is the integral part of any gas migration control phenomenon or process within the cement slurry composition. It minimizes free water and improves slurry stability which again is an important parameter in combating gas migration. The additive of this invention is multi-functional. Its numerous functions all contribute to the ability to control gas migration. Adding extenders, fluid loss additives, and free water control agents separately is not required when using this invention.

The cementing composition according to the disclosed invention can be used to: (1) prevent the occurrence of "gas-channeling" during the process of cementing oil and gas wells; (2) function as density-reducing extender; (3) control fluid loss, (4) minimize free water and improve slurry stability and (5) stabilize nitrogen foam.

Gas channeling occurs when the hydrostatic pressure exerted by the cement column decays to a pressure below the pore pressure of an oil or gas bearing reservoir. The pressure decay within the cement column is due to cement volume losses due to hydration and from fluid loss to permeable strata. These effects cause the cement to be self-supporting and therefore unable to transmit full fluid hydrostatic pressure. Gas migration can seriously compromise the hydraulic integrity of the cement sheath and can cause safety problems at the surface due to lack of zonal isolation.

Gas migration within a wellbore can occur in a variety of downhole pressure circumstances. Therefore cement density may have to be lowered in order to place the cement without exceeding the formation fracture pressure. An extender can be used to lower the density of the slurry, thereby allowing for a lower density slurry to be used. The extender should allow for the addition of water without compromising the stability and free water control of the system.

The additive of this invention controls fluid loss which is important in controlling viscosity and thickening time of a cement composition. Fluid can be lost from cement compositions when the cement filtrate, the fluid phase of the cement composition, seeps into the permeable walls of a formation. When cement filtrate moves into the permeable walls, a layer of solids deposit on the wall.

Under differential pressure, cement slurries lose filtrate to permeable formations. The loss of filtrate from the slurry can impact the ability to place the cement due to dehydration and subsequent viscosification of the slurry. Loss of fluid, either internally to hydration, or externally due to fluid loss, reduces the ability of the cement to transmit full hydrostatic pressure to a point where the cement becomes self-supporting and unable to control formation pore pressure. When this occurs, the cement is susceptible to the movement of gas or other fluids into the annulus between the casing and formation.

The additive of this invention minimizes free water, which improves slurry stability. Free water is water that separates from the cement composition after it is placed in the well bore. Free water tends to migrate up within the cement column because the free water is less dense than the particles in the cement composition. Minimizing the free water in the cement composition makes the density of the top of the column of cement composition equal to that or close to that on the bottom so the column is homogeneous, whereas free water causes the column of cement composition to be light on top and very heavy on the bottom.

Supernatant water breakout is free water that has broken out of a cement slurry. Controlling supernatant water breakout of a slurry will limit possible pathways for formation fluids to penetrate through the cement sheath and cause channeling, especially under deviated conditions. Producing a stable cement design will ensure a consistent density profile from the top of the cement sheath to the bottom. Supernatent water breakout can be controlled by placing the water demanding chemicals of this invention such as sodium metasilicate, sodium silicate, HEC, and CMHEC within the additive system. These chemicals have a high water demand, thereby increasing slurry and decreasing the amount of supernatant water breakout viscosity.

The present invention functions as a stabilizer when a foaming agent and nitrogen gas are introduced to the cement. Nitrogen gas is sometimes added to a cement composition containing a surfactant or foaming agent to create a foam which reduces further the density of the system. The nitrogen foam that is created is basically a series of bubbles in close proximity with one another. These materials will tend to be unstable and coalesce into much larger bubbles and ultimately break out. The additive of this invention stabilizes the foam, keeping the foam bubbles at about the same diameter and making a much more homogeneous foam.

The following examples and tables will illustrate the invention, but should not be construed to limit the scope thereof unless otherwise expressly noted.

EXAMPLE 1

Following is a procedure for making a multifunctional additive for a cement slurry composition for use in an oil or gas well. It is pourable and stable from about 40 F to about 120 F.

The additive is mixed in a 1 liter glass blender bowl (preheated to 140 F) with a rheostat speed control. This version does not contain any anti-foam.

1. Add 210 g. fresh 140 F water.
2. Add 9 g. carrageenan, solvate for 2 minutes.
3. Add 279 g. sodium silicate solution, 52.1 Be, 2.0 weight ratio.
4. Add 2 g Hostadrill 2825, mix for 2 minutes.
5. Add 33 g CMHEC, mix for 2 min.
6. Add 2.5 g. sodium polyacrylate, mix 2 min.
7. Add 7.5 g CD31 commercially available from BJ Services, mix 2 min.
8. Add 2.5 g sodium aluminate, mix 2 min.
9. Add 0.3 ml. Xcide 102, mix 2 min.
10. (Optional) Add. 5 g of Simacid Blue 23123 commercially available from WS Simpson, London.

Following are Tables 1 through 4, which presents data from analyses performed on La Farge Class H Cement Slurry Compositions of various densities that includes the additive of this invention and Calport Class G Cement Slurry Compositions of various densities that include the additive of this invention.

TABLE 1

LaFarge Class H Plus Additive

| Temp °F. | Density Lbm/gal | GHS Additive | GHS A-7L | GHS CD-31L | GHS other | % other | TT at BHCT | Fluid Loss cc/30 min | UCA @ BHST 50/500/24 Hr |
|---|---|---|---|---|---|---|---|---|---|
| 80 | 12.00 | 85 | 70 | | | | 18:00+ | 80 cc | |
| 102 | 12.00 | 85 | | | | | 10:00 | 148 cc | |
| 118 | 12.00 | 85 | | | | | 6:53 | 74 cc | |
| 140 | 12.00 | 85 | | | | | 6:11 | 236 cc | |
| 167 | 12.00 | 85 | | | | | 3:06 | 146 cc | |
| 80 | 12.50 | 80 | 30 | | | | 17:51 | 58 cc | |
| 102 | 12.50 | 80 | | | | | 11:42 | 120 cc | |
| 118 | 12.50 | 80 | | | | | 5:10 | 154 cc | 3:44/NA/340 psi |
| 140 | 12.50 | 80 | | | | | 3:13 | 215 cc | |
| 167 | 12.50 | 80 | | | | | 3:06 | 116 cc | |
| 80 | 13.00 | 70 | | | | | 14:53 | 82 cc | |
| 102 | 13.00 | 70 | | | | | 7:54 | 124 cc | |
| 118 | 13.00 | 70 | | | | | 4:13 | 189 cc | |
| 140 | 13.00 | 70 | | | | | 1:10 | 204 cc | |
| 140 | 13.00 | 70 | | | | | 2:23 | | |
| 140 | 13.00 | 70 | | | | | 3:07 | | |
| 140 | 13.00 | 70 | | | | | 4:05 | 118 cc | 4:22/12:28/600 psi |
| 140 | 13.00 | 70 | | | | | 7:37 | 120 cc | |
| 167 | 13.00 | 70 | | | | | 2:12 | 126 cc | |
| 167 | 13.00 | 70 | | | | | 4:00 | 136 cc | |
| 167 | 13.00 | 70 | | | | | 8:28 | | |
| 167 | 13.00 | 70 | | | | | 1:28 | | |
| 167 | 13.00 | 70 | | | | | 3:00 | 142 cc | 2:10/12:57/559 psi |
| 167 | 13.00 | 70 | | | | | 5:52 | 132 cc | |
| 197 | 13.00 | 70 | | | | | 3:37 | 167 cc | |
| 197 | 13.00 | 70 | | | | | 5:08 | 142 cc | |
| 233 | 13.00 | 70 | | | | | 3:58 | 423 cc | 4:09/11:53/510 psi |
| 233 | 13.00 | 70 | | | | | 6:02 | 334 cc | 6:30/NA/325 psi |

| Temp °F. | Rheologies 600/300/200/100/6/3 | Free H2O @ 45° | Comments |
|---|---|---|---|
| 80 | 86/45/33/18/2/1 | 5.8 mL | with sea water |
| 102 | 96/59/43/25/3.5/3 | Trace | with sea water |
| 118 | 96/61/46/29/3.5/2 | 0.2 mL | with sea water |
| 140 | 77/41/29/16/2/1 | 4.5 mL | with sea water |
| 167 | 63/36/26/15/1.5/1 | 1.5 mL | with sea water/ 20 GHS R-21L |
| 80 | 123/80/62/40/6/4 | Zero | with sea water |
| 102 | 132/86/66/40/6/4 | Zero | with sea water |
| 118 | 128/83/64/39/6/4 | | with sea water |
| 140 | 105/65/48/29/4/3 | | with sea water |
| 167 | 77/46/34/20/1.5/1 | 0.5 mL | with sea water/20 GHS R-21L |
| 80 | 181/123/97/63/11/7 | Zero | with sea water |
| 102 | 188/125/97/61/10/7.5 | Zero | with sea water |
| 118 | 128/79/59/36/6/4 | | with sea water/Gas Tight |
| 140 | 127/78/58/35/6/5 | | with sea water |
| 140 | | | with sea water/5GHS R-21L |
| 140 | | | with sea water/10GHS R-21L |
| 140 | 104/66/50/31/4/3 | Zero | with sea water/12.5GHS R-21L |
| 140 | | | with sea water/15GHS R-21L |
| 167 | 109/69/52/31/3.5/2.5 | | with sea water/15GHS R-21L |
| 167 | 96/59/44/26/3/2 | Trace | with sea water/17.5 GHS R-21L |
| 167 | | | with sea water/20GHS R-21L |
| 167 | | | with sea water/5GHS R-8L |
| 167 | 116/76/58/36/5.5/3.5 | Zero | with sea water/7 GHS R-8L |
| 167 | 92/56/43/26/5/4 | | with sea water/8 GHS R-8L |
| 197 | | 0.2 mLs | with sea water/7 GHS R-8L |
| 197 | 96/61/46/28/4.5/3.5 | | with sea water/8 GHS R-8L |
| 233 | 80/55/41/25/4.5/4 | | with sea water/8 GHS R-8L |
| 233 | | | with sea water/9 GHS R-8L |

TABLE 2

LaFarge Class H Plus Additive

| Temp °F. | Density Lbm/gal | GHS Additive | GHS A-7L | GHS CD-31L | GHS other | % other | TT at BHCT | Fluid Loss cc/30 min | UCA @ BHST 50/500/24 Hr |
|---|---|---|---|---|---|---|---|---|---|
| 80 | 13.50 | 60 | | | | | 11:55 | 106 cc | |
| 102 | 13.50 | 60 | | | | | 5:24 | 126 cc | |
| 118 | 13.50 | 60 | | | | | 3:13 | 174 cc | |

TABLE 2-continued

LaFarge Class H Plus Additive

| Temp °F | Density Lbm/gal | GHS Additive | GHS other | % other | TT at BHCT | Fluid Loss cc/30 min | UCA @ BHST 50/500/24 Hr |
|---|---|---|---|---|---|---|---|
| 140 | 13.50 | 60 | | | 1:42 | 192 cc | |
| 140 | 13.50 | 60 | | | 3:02 | | |
| 167 | 13.50 | 60 | | | 3:20 | | |
| 197 | 13.50 | 60 | | | 3:17 | | |
| 80 | 14.00 | 55 | | | 11:07 | 106 cc | |
| 102 | 14.00 | 55 | | | 4:44 | 153 cc | |
| 118 | 14.00 | 55 | | | 2:45 | 212 cc | |
| 140 | 14.00 | 55 | | | 3:07 | 106 cc | |
| 167 | 14.00 | 55 | | | 3:41 | 144 cc | |
| 197 | 14.00 | 55 | | | 4:20 | | |
| 80 | 14.50 | 50 | | | 9:00 | 94 cc | |
| 102 | 14.50 | 50 | | | 4:05 | 122 cc | 4:32/6:51/1910 psi |
| 118 | 14.50 | 50 | | | 2:30 | 158 cc | |
| 140 | 14.50 | 50 | | | 1:20 | 170 cc | |
| 167 | 14.50 | 50 | | | 2:13 | | |
| 167 | 14.50 | 50 | | | 3:23 | 175 cc | |
| 167 | 14.50 | 50 | | | 7:13 | | |
| 197 | 14.50 | 50 | | | 3:09 | 340 cc | |
| 197 | 14.50 | 50 | | | 7:57 | 238 cc | |
| 233 | 14.50 | 50 | | | 6:57 | 223 cc | |
| 102 | 16.20 | 15 | 20 | | 6:02 | 82 cc | |
| 118 | 16.20 | 15 | 20 | | 4:00 | 103 cc | 4:49/5:36/3179 psi |
| 140 | 16.20 | 15 | 20 | | 3:47 | 125 cc | |
| 167 | 16.20 | 20 | 25 | | 2:15 | 123 cc | |
| 167 | 16.20 | 15 | 20 | | 4:12 | 130 cc | |

| Temp °F | Rheologies 600/300/200/100/6/3 | Free H2O @ 45° | Comments |
|---|---|---|---|
| 80 | 201/133/102/65/10.5/8 | | with sea water |
| 102 | 163/102/76/47/8/7 | | with sea water |
| 118 | 160/100/75/46/8/6 | | with sea water/Gas Tight |
| 140 | 163/100/75/45/7/5 | | with sea water |
| 140 | | | with sea water/10 GHS R-21L |
| 167 | | | with sea water/12.5 GHS R-21L |
| 197 | | | with sea water/6 GHS R-8L |
| 80 | 240/159/124/80/14/11 | Zero | with sea water |
| 102 | 212/134/101/62/10/8 | Zero | with sea water |
| 118 | 173/102/75/43/7/6 | 0.2 mL | with sea water |
| 140 | 161/102/78/48/7/5 | Trace | with 10 GHS R-21L |
| 167 | 127/77/58/34/4/3 | Trace | with sea water/15 GHS R-21L |
| 197 | | | with sea water/6 GHS R-8L |
| 80 | 292/194/151/98/19/15 | | with sea water |
| 102 | 272/179/140/90/20/18 | | with sea water |
| 118 | 291/192/148/96/22/20 | | with sea water |
| 140 | 237/153/117/75/20/19 | | with sea water |
| 167 | | | with sea water/4 GHS R-8L |
| 167 | 140/90/69/43/9.5/8 | Trace | with sea water/5 GHS R-8L |
| 167 | | | with sea water/6 GHS R-8L |
| 197 | 149/97/75/47/11/10 | | with sea water/5 GHS R-8L |
| 197 | 137/87/66/41/8/6/5 | Trace | with sea water/6 GHS R-8L |
| 233 | 128/81/61/38/7/5 | | with sea water/6 GHS R-8L |
| 102 | 236/137/99/58/10/7 | | with sea water |
| 118 | 224/128/93/55/9.5/8 | | with sea water |
| 140 | 207/119/86/49/7/5 | | with sea water |
| 167 | 277/170/128/78/14/11 | | with sea water |
| 167 | 190/113/83/50/9/8 | Zero | with sea water/2 GHS R-21L |

TABLE 3

Calport Class G Plus Additive

| Temp °F | Density Lbm/gal | GHS Additive | GHS A-7L | GHS CD-31L | GHS other | % other | TT at BHCT | Fluid Loss cc/30 min | UCA @ BHST 50/500/24 Hr |
|---|---|---|---|---|---|---|---|---|---|
| 80 | 12.00 | 100 | 50 | | | | 12:00+ | 54 cc | |
| 100 | 12.00 | 100 | | | | | 9:56 | 68 cc | |
| 118 | 12.00 | 100 | | | | | 4:25 | 74 cc | |
| 140 | 12.00 | 100 | | | | | 2:20 | 88 cc | |
| 167 | 12.00 | 100 | | | | | 3:50 | 104 cc | |
| 197 | 12.00 | 100 | | | | | 4:50 | | |
| 80 | 12.50 | 100 | 50 | | | | 18:40 | 60 cc | |
| 100 | 12.50 | 100 | 50 | | | | 11:33 | 52 cc | |
| 100 | 12.50 | 100 | | | | | 8:20 | 54 cc | |
| 118 | 12.50 | 100 | | | | | 4:28 | 56 cc | |

TABLE 3-continued

Calport Class G Plus Additive

| Temp °F | Density Lbm/gal | GHS Additive | GHS A-7L | GHS CD-31L | GHS other | % other | TT at BHCT | Fluid Loss cc/30 min | UCA @ BHST 50/500/24 Hr |
|---|---|---|---|---|---|---|---|---|---|
| 140 | 12.50 | 100 | | | | | 1:58 | 72 cc | |
| 167 | 12.50 | 100 | | | | | 1:45 | | |
| 167 | 12.50 | 100 | | | | | 1:43 | | |
| 167 | 12.50 | 100 | | | | | 2:52 | | |
| 167 | 12.50 | 100 | | | | | 3:31 | 142 cc | |
| 197 | 12.50 | 100 | | | | | 3:52 | | |
| 100 | 13.00 | 80 | | | | | 7:11 | 58 cc | |
| 100 | 13.00 | 80 | 50 | | | | 10:56 | 62 cc | |
| 118 | 13.00 | 80 | | | | | 3:35 | 70 cc | |
| 140 | 13.00 | 80 | | | | | 1:54 | 96 cc | |
| 167 | 13.00 | 80 | | | | | 3:03 | 110 cc | |
| 167 | 13.00 | 80 | | | | | 3:39 | | |
| 167 | 13.00 | 80 | | | | | 1:48 | | |
| 167 | 13.00 | 80 | | | | | 2:17 | | |
| 167 | 13.00 | 80 | | | | | 3:06 | 156 cc | |
| 197 | 13.00 | 80 | | | | | 3:09 | 102 cc | |
| 197 | 13.00 | 80 | | | | | 6:02 | | |

| Temp °F | Rheologies 600/300/200/100/6/3 | Free H2O @ 45° | Comments |
|---|---|---|---|
| 80 | 134/97/73/48/7/5 | Trace | with sea water |
| 100 | 107/70/53/33/4/2.5 | 0.4 mL | with sea water |
| 118 | 97/62/47/29/3.5/2 | 0.2 mL | with sea water/Gas Tight |
| 140 | 90/58/44/27/4/3 | Trace | with sea water |
| 167 | 77/48/37/22/2.5/1.5 | 0.3 mL | with sea water/8 GHS R-8L |
| 197 | | | with sea water/8 GHS R-8L |
| 80 | 185/123/96/62/9.5/6.5 | Zero | with sea water |
| 100 | 146/99/78/51/8/6 | | with sea water |
| 100 | 198/137/109/72/12/7 | | with sea water |
| 118 | 142/96/75/49/8/5 | | with sea water |
| 140 | 160/108/84/69/10.5/7 | | with sea water |
| 167 | | | with sea water/12 GHS R-21L |
| 167 | | | with sea water/4 GHS R-8L |
| 167 | | | with sea water/7 GHS R-8L |
| 167 | 107/69/53/32/5/3 | 0.3 mL | with sea water/8 GHS R-8L |
| 197 | | | with sea water/8 GHS R-8L |
| 100 | 161/108/83/55/9/6 | | with sea water |
| 100 | 147/96/74/47/7/4.5 | | with sea water |
| 118 | 154/101/79/51/9/6 | | with sea water |
| 140 | 153/101/78/50/10/8 | | with sea water |
| 167 | 124/80/62/39/7/6 | | with sea water/12 GHS R-21L |
| 167 | | | with sea water/15 GHS R-21L |
| 167 | | | with sea water/4 GHS R-8L |
| 167 | | | with sea water/5 GHS R-8L |
| 167 | 109/69/53/33/6/4 | Trace | with sea water/6 GHS R-8L |
| 197 | 102/66/51/33/5/3 | 0.4 mL | with sea water/6 GHS R-8L |
| 197 | | | with sea water/7 GHS R-8L |

TABLE 4

Calport Class G Plus Additive

| Temp °F | Density Lbm/gal | GHS Additive | GHS A-7L | GHS CD-31L | GHS other | % other | TT at BHCT | Fluid Loss cc/30 min | UCA @ BHST 50/500/24 Hr |
|---|---|---|---|---|---|---|---|---|---|
| 80 | 13.50 | 70 | 50 | | | | 8:13 | 160 cc | |
| 102 | 13.50 | 70 | | | | | 11:50 | 64 cc | |
| 102 | 13.50 | 70 | 50 | | | | 5:38 | 92 cc | |
| 118 | 13.50 | 70 | | | | | 5:55 | 70 cc | |
| 140 | 13.50 | 70 | | | | | 1:37 | | |
| 140 | 13.50 | 70 | | | | | 2:28 | | |
| 140 | 13.50 | 70 | | | | | 5:35 | 80 cc | |
| 140 | 13.50 | 70 | | | | | 4:52 | | |
| 167 | 13.50 | 70 | | | | | 4:08 | 34 cc | |
| 167 | 13.50 | 70 | | | | | 1:48 | | |
| 197 | 13.50 | 70 | | | | | 3:37 | 144 cc | |
| 197 | 13.50 | 70 | | | | | 7:41 | | |
| 80 | 14.00 | 60 | | | | | 10:43 | 60 cc | |
| 102 | 14.00 | 60 | | | | | 3:17 | 70 cc | |
| 118 | 14.00 | 60 | | | | | 4:10 | 64 cc | |
| 140 | 14.00 | 60 | | | | | 3:06 | 82 cc | |
| 167 | 14.00 | 60 | | | | | 1:35 | | |
| 167 | 14.00 | 60 | | | | | 3:08 | 88 cc | |
| 197 | 14.00 | 60 | | | | | 6:39 | 124 cc | |

TABLE 4-continued

| | | | Calport Class G Plus Additive | | |
|---|---|---|---|---|---|
| 102 | 14.50 | 50 | | 5:44 | 70 cc |
| 118 | 14.50 | 50 | | 3:28 | 82 cc |
| 140 | 14.50 | 50 | | 4:45 | 78 cc |
| 167 | 14.50 | 50 | | 4:33 | 90 cc |
| 197 | 14.50 | 50 | | 4:24 | 147 cc |

| Temp °F. | Rheologies 600/300/200/100/6/3 | Free H2O @ 45° | Comments |
|---|---|---|---|
| 80 | 243/167/134/97/39/31 | Trace | with sea water |
| 102 | 212/139/108/69/10.5/7 | | with sea water |
| 102 | 204/135/108/73/15/11 | | with sea water |
| 118 | 205/135/104/67/10/6.5 | | with sea water |
| 140 | | | with sea water |
| 140 | | | with sea water/10 GHS R-21L |
| 140 | 188/127/98/63/10/7.5 | Zero | with sea water/15 GHS R-21L |
| 140 | | | with sea water/5 GHS R-8L |
| 167 | 166/109/84/53/8/6 | | with sea water/15 GHS R-21L |
| 167 | | | with sea water/4 GHS R-8L |
| 197 | 157/104/81/52/9/6 | | with sea water/5 GHS R-8L |
| 197 | | | with sea water/6 GHS R-8L |
| 80 | 281/184/143/93/17/13 | Zero | with sea water |
| 102 | 220/113/74/17/13 | Zero | with sea water |
| 118 | 228/151/118/76/11/7 | Zero | with sea water/5 GHS R-21L |
| 140 | 201/134/104/67/11/7 | Zero | with sea water/10 GHS R-21L |
| 167 | | | with sea water/4 GHS R-8L |
| 167 | 175/116/89/57/9/7 | 0.2 mL | with sea water/5 GHS R-8L |
| 197 | 150/99/77/49/9/6 | 0.4 mL | with sea water/6 GHS R-8L |
| 102 | 239/154/119/75/14/10 | | with sea water |
| 118 | 232/144/115/72/13/9 | | with sea water |
| 140 | 195/126/97/61/10/6 | Trace | with sea water/10 GHS R-21L |
| 167 | 187/114/87/54/9/7 | 0.3 mL | with sea water/4 GHS R-8L |
| 197 | 131/82/62/39/8/6 | Trace | with sea water/4 GHS R-8L |

EXAMPLE 2

The Gasflow Model

The Gasflow Model is practical laboratory test equipment that may be used to stimulate the cemented annulus between a pressurized gas sand and a low pressure permeable zone. In a typical well configuration where a cement slurry in the annulus between the casing and the formation, the cement is exposed to a highly permeable gas zone and a lower pressure permeable zone. Hydrostatic pressure on the unset cement keeps gas intrusion from occurring. During the cement hydration, the hydrostatic pressure is relieved and the cement pore pressure may decrease below the gas reservoir pressure and allow gas to intrude the cement column. The gas may penetrate to the well surface or to another lower pressurized permeable zone.

The Gasflow Model can simulate the well configuration described above. A 3 inch outside diameter by 10 inches long stainless steel cylinder contains the cement slurry. A (325/60) mesh stainless steel screen or a core is fitted at the bottom of the test cell. A back pressure regulator connected to the bottom assembly will represent lower pressure permeable zone. The top of the cylinder consists of a head arrangement that will allow introduction of the pressure on top of the piston simulating hydrostatic pressure. Also, a traveling piston fitted with a 325 mesh screen or a core represents the high pressure formation. The Gas-flow Model is commercially available from BJ Services as Part Number 51030-2.

This Gasflow Model can be used to analyze different cement cement formulations at simulated bottomhole temperatures for fluid loss, transition time, and premeability to resist gas intrusions. The manual consists of step by step procedures on how to assemble the gasflow mode, computer set-up, mix and run cement test, clean up the test cell and print the test data.

EXAMPLE 3

Gas Model Output

The Gas Model analysis presented in FIG. 1 was performed, based on the methods described in Example 3, to test a cement slurry at a simulated well temperature of 118° F. The cement slurry was prepared by using 90 gallons per 100 sacks of cemment and 11.11 gallons of sea water per sack of a class H cement. The density of the cement slurry was 13 pounds per gallon.

The graphic representation output of the Gas Model presented in FIG. 1 may be interpreted as follows:

The Slurry temperature curve displays the temperature of the slurry on the interior of the test cell.

The filtrate volume is the amount of filtrate that penetrates through the 325-mesh screen at the base of the test cell. This value is similar to API fluid loss, but takes place over the duration of the test, not the 30-minute time span of the API test.

Gas Volume is the amount of gas that enters the cell displacing the filtrate. For a successful test to take place, this volume must be less than the filtrate volume.

Cement pore pressure is the pressure recorded by the transducer located on the side of the test cell. As the cement sets, it loses the ability to transmit measurable hydrostatic pressure to the transducer. As the cement sets the cement pore pressure falls. If gas communication through the cement column occurs, the cement pore pressure will rise after an initial decline. A continuously declining pore pressure indicates zero gas flow through the cement column.

What is claimed is:

1. A cement composition for cementing oil, gas or geothermal wells, comprising:
   cement; and
   an additive comprising a blend of sodium silicate; water; a carrageenan suspending agent; sodium polyacrylate; a terpolymer product comprising 2-acrylamido-2-methyl propane-3-sulfonic acid, N-vinyl-N-methyl acetamide, and acrylamide; a dispersant; and a cellulosic water soluble polymer.

2. A cement composition of claim 1, wherein the dispersant comprises a sulfonated naphthalene formaldehyde condensate or a sulfonated acetone formaldehyde condensate.

3. A cement composition of claim 1, wherein said cellulosic water soluble polymer comprises hydroxy ethyl cellulose or carboxymethyl hydroxy ethyl cellulose.

4. A cement additive comprising:
   sodium silicate;
   a suspending agent;
   sodium polyacrylate;
   a terpolymer product comprising 2-acrylamido-2-methyl propane-3-sulfonic acid, N-vinyl-N-methyl acetamide, and acrylamide;
   a dispersant;
   a cellulosic water soluble polymer; and
   water.

5. A cement additive of claim 4, wherein the dispersant comprises a sulfonated naphthalene formaldehyde condensate.

6. A cement additive of claim 4, wherein said cellulosic water soluble polymer comprises hydroxy ethyl cellulose or carboxymethyl hydroxy ethyl cellulose.

7. A cement additive of claim 4, wherein the suspending agent is a carrageenan suspending agent.

8. A cement additive, comprising:
   a suspending agent;
   a water absorbant material;
   a dispersant;
   a sulfonated acetone formaldehyde condensate;
   sodium polyacrylate;
   and a cellulosic water soluble polymer.

9. A cement additive of claim 8, wherein said dispersant comprises a terpolymer product comprising 2-acrylamido-2-methyl propane-3-sulfonic acid, N-vinyl-N-methyl acetamide, and acrylamide.

10. A cement additive of claim 8, wherein said cement additive is suspended in oil.

11. A cement additive of claim 10, wherein said oil comprises synthetic oil, mineral oil, processed oil, hydrocarbon oil, or vegetable oil.

12. A cement additive of claim 8, wherein said suspending agent comprises a carrageenan suspending agent.

13. A cement additive of claim 8, wherein said water absorbant material comprises sodium metasilicate.

14. A cement additive for use in an oil, gas, or geothermal well, comprising:
   water at about 38.93% by weight;
   sodium silicate at about 51.72% by weight;
   a cellulosic water soluble polymer at about 6.6% by weight;
   a sulfonated naphthalene formaldehyde condensate at about 1.4% by weight;
   sodium polyacrylate at about 0.46% by weight;
   a terpolymer dispersant comprising 2-acrylamido-2-methyl propane-3-sulfonic acid, N-vinyl-N-methyl acetamide, and acrylamide at about 0.37% by weight;
   a carrageenan suspending agent at about 0.35% by weight;
   potassium chloride at about 0.12% by weight; and
   biocide at about 0.02% by weight.

15. A cement additive for use in an oil, gas, or geothermal well, comprising:
   water at about 30.00% to 50.00% by weight;
   sodium silicate at about 40.00% to 60.00% by weight;
   a cellulosic water soluble polymer at about 1.0% to 8.0% by weight;
   a sulfonated naphthalene formaldehyde condensate at about 0.5% to 3.0% by weight;
   sodium polyacrylate at about 0.1% to 1.0% by weight;
   a terpolymer dispersant comprising 2-acrylamido-2-methyl propane-3-sulfonic acid, N-vinyl-N-methyl acetamide, and acrylamide at about 0.1% to 1.0% by weight;
   a carrageenan suspending agent at about 0.1% to 1.0% by weight;
   potassium chloride at about 0.05% to 1.0% by weight; and
   biocide at about 0.01% to 0.05% by weight.

16. The cement additive of claim 15, further comprising blue dye at about 0.01% to 0.05% by weight.

17. A method for reducing the occurrence of gas channeling in cement, comprising:
   adding a cement additive to a cement slurry, where said cement additive comprises:
   water at about 30.00% to 50.00% by weight;
   sodium silicate at about 40.00% to 60.00% by weight;
   a cellulosic water soluble polymer at about 1.0% to 8.0% by weight;
   a sulfonated naphthalene formaldehyde condensate at about 0.5% to 3.0% by weight;
   sodium polyacrylate at about 0.1% to 1.0% by weight;
   a terpolymer dispersant comprising 2-acrylamido-2-methyl propane-3-sulfonic acid, N-vinyl-N-methyl acetamide, and acrylamide at about 0.1% to 1.0% by weight;
   a carrageenan suspending agent at about 0.1% to 1.0% by weight;
   potassium chloride at about 0.05% to 1.0% by weight; and
   biocide at about 0.01% to 0.05% by weight.

18. A method for reducing the occurrence of gas channeling in cement, comprising:
   adding a cement additive to a cement slurry, where said cement additive comprises:
   sodium silicate;
   a carrageenan suspending agent;
   sodium polyacrylate;
   a terpolymer product comprising 2-acrylamido-2-methyl propane-3-sulfonic acid, N-vinyl-N-methyl acetamide, and acrylamide;
   a dispersant;
   a cellulosic water soluble polymer; and
   water.

19. A method according to claim 18, wherein the dispersant comprises a sulfonated naphthalene formaldehyde condensate.

20. A method according to claim 18, wherein said cellulosic water soluble polymer comprises hydroxy ethyl cellulose or carboxymethyl hydroxy ethyl cellulose.

21. A method for reducing the occurrence of gas channeling in cement, comprising:
adding a cement additive to a cement slurry, wherein said cement additive comprises a suspending agent; a water absorbant material; a dispersant; a sulfonated acetone formaldehyde condensate; sodium polyacrylate; a terpolymer product comprising 2-acrylamido-2-methyl propane-3-sulfonic acid, N-vinyl-N-methyl acetamide, and acrylamide; and a cellulosic water soluble polymer.

22. A method of claim 21, wherein the cement additive is suspended in oil before adding the cement additive to the cement slurry.

23. A method of claim 22, wherein said oil comprises synthetic oil, mineral oil, processed oil, hydrocarbon oil, or vegetable oil.

24. A method of claim 21, herein said suspending agent comprises carrageenan.

25. A method of claim 21, wherein said water absorbant material comprises sodium metasilicate.

26. A method for stabilizing foam created by adding nitrogen gas to a cement composition, comprising:
adding a multifunctional additive to cement, where said additive comprises:
water at about 30.00% to 50.00% by weight;
sodium silicate at about 40.00% to 60.00% by weight;
a cellulosic water soluble polymer at about 1.0% to 8.0% by weight;
a sulfonated naphthalene formaldehyde condensate at about 0.5% to 3.0% by weight;
sodium polyacrylate at about 0.1% to 1.0% by weight;
a terpolymer dispersant comprising 2-acrylamido-2-methyl propane-3-sulfonic acid, N-vinyl-N-methyl acetamide, and acrylamide at about 0.1% to 1.0% by weight;
a carrageenan suspending agent at about 0.1% to 1.0% by weight;
potassium chloride at about 0.05% to 1.0% by weight; and
biocide at about 0.01% to 0.05% by weight.

27. An additive for stabilizing foam created by adding nitrogen gas to a cement composition, comprising:
sodium silicate;
a suspending agent;
sodium polyacrylate;
a 2-acrylamido-2-methyl propanesulfonic acid terpolymer dispersant;
a cellulosic water soluble polymer; and
water.

28. An additive of claim 27, further comprising a sulfonated naphthalene formaldehyde condensate dispersant.

29. An additive of claim 27, wherein the cellulosic water soluble polymer comprises hydroxy ethyl cellulose or carboxymethyl hydroxy ethyl cellulose.

30. An additive of claim 27, wherein the suspending agent is a carrageenan suspending agent.

* * * * *